(12) United States Patent
Lee

(10) Patent No.: US 7,127,963 B2
(45) Date of Patent: *Oct. 31, 2006

(54) TILT DEVICE FOR VEHICULAR STEERING COLUMN

(75) Inventor: Byeong-Hoon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 168 days.

This patent is subject to a terminal disclaimer.

(21) Appl. No.: 10/241,706

(22) Filed: Sep. 12, 2002

(65) Prior Publication Data

US 2003/0126939 A1 Jul. 10, 2003

(30) Foreign Application Priority Data

Jan. 4, 2002 (KR) .................................. 2002-519

(51) Int. Cl.
*B62D 1/18* (2006.01)
(52) U.S. Cl. ........................................ 74/493; 280/775
(58) Field of Classification Search .................. 74/493; 280/775
See application file for complete search history.

(56) References Cited

U.S. PATENT DOCUMENTS

| 3,487,711 | A | * | 1/1970 | Sippel ........................ 74/493 |
| 5,222,410 | A | * | 6/1993 | Kinoshita .................... 74/493 |
| 5,820,163 | A | * | 10/1998 | Thacker et al. ............. 280/775 |
| 6,282,977 | B1 | * | 9/2001 | Satoh et al. .................. 74/493 |
| 6,481,310 | B1 | * | 11/2002 | Janeczko et al. ............. 74/493 |
| 6,591,709 | B1 | * | 7/2003 | Kim et al. .................... 74/493 |
| 2004/0200305 | A1 | * | 10/2004 | Lee .............................. 74/493 |

* cited by examiner

*Primary Examiner*—William C Joyce
(74) *Attorney, Agent, or Firm*—Greenblum & Bernstein, P.L.C.

(57) ABSTRACT

The present invention relates to a tilt device for a vehicular steering column, which permits a lock slider cooperating with an operating lever to regulate pivoting of a movable gear by simplifying the engagement structure between the movable gear and a fixed gear to reduce the number of parts and enhance assembling ability, thereby reducing manufacturing cost. The tilt device of the invention also minimizes the operating force of the operating lever while elevating the coupling force between the operating lever and a lock slider so as to improve convenience of users.

7 Claims, 4 Drawing Sheets

TILT DEVICE FOR VEHICULAR STEERING COLUMN

BACKGROUND OF THE INVENTION

1. Field of the Invention

The present invention relates to a tilt device for a vehicular steering column, in particular, which is adapted to adjust the angle of the steering column through engagement/disengagement between a fixed gear and a movable gear pivoting under the regulation due to reciprocation of a lock slider penetrated by a tilt lever.

2. Description of the Related Art

In general, a tilt device is so designed to tiltingly adjust the angle of a steering wheel in a vertical direction according to physical condition or driving posture of a driver.

A conventional tilt device 100 will be schematically described with its structure according to the operation in reference to FIG. 1. When an operating lever 120 with one hinged end is pivoted in order to adjust the angle of a fixed steering column 110, a rod 122 cooperates so that a tilt bracket 130 also is pivoted counterclockwise under the regulation of a wedge 136 which supports the rear face of a movable gear 140 with a protrusion 134 so formed to couple with a hole 132 of the tilt bracket 130. The movable gear 140 is released from engagement with the fixed gear 150 as a projection pin 142 settled in an inclination groove 131 of the tilt bracket 130 slides down along an inclined plane.

Then, the angle of the steering column 110 is adjusted, and upon releasing external pressure applied to the operating lever 120 penetrating a lock slider 124, the fixed gear 150 and the movable gear 140 are engaged again as the tilt bracket 130 returns to its original position. Reengagement of the gears 140 and 150 is tightly fixed by the wedge 136.

Further, the fixed gear 150 and the movable gear 140 are installed in a pair in order to increase the engagement strength of the fixed and movable gears 150 and 140. The movable gear 140 ensures a position on the same axis by a gear bush (not shown) having a projection pin (not shown) and a fixing bolt 160.

In the conventional tilt device 100 configured as above, however, the structure to make the driving force of the operating lever 120 cooperate with pivoting of the movable gear 140 engaged/disengaged into/from the fixed gear 150 is complicated. Further, a projection pin of a gear bush is occasionally fractured. This directly results in high cost of manufacture of the tilt device 100.

The operating direction of the wedge 136 is identical with the rotating direction of the tilt bracket 130. This may cause an insufficient gap between the operating member 140 and the wedge 136 so as to generate an operational error. Further, the operating direction of the operating lever 120 is different from that of the tilt bracket 130 so that loss takes place until the operating force of the operating lever 120 reaches the tilt bracket 130. Then, a certain amount of force is applied that is larger than the actually required operating force of the operating lever 120 which reduces the operating ability.

As another problem, the operating lever 120 and the lock slider 124 regulating the operating lever are coupled through simple penetration only, thereby causing the fixed state of the operating lever 120 to be unstable, as well as generating noises due to mutual friction.

SUMMARY OF THE INVENTION

Accordingly, the present invention has been made to solve the foregoing problems and it is an object of the present invention to provide a tilt device for a vehicular steering column, which simplifies the engagement structure between a movable gear and a fixed gear due to an operating lever to reduce the number of parts and enhance assembling ability thereby reducing manufacturing cost. The tilt device of the invention also minimizes the operating force of the operating lever while elevating the coupling force between the operating lever and a lock slider so as to improve convenience of users.

According to an aspect of the invention to obtain the above objects, it is provided a tilt device in an apparatus for adjusting the angle of a steering column through selective engagement and disengagement between a fixed gear and a movable gear cooperating with a tilt lever, in which the tilt device includes a lock slider having an upward projection and an extension at one side, the lock slider being penetrated by the tilt lever to reciprocate due to pivoting of the tilt lever; a movable gear having a recessed underside and a downward inflection at one side each for contacting with the projection and the extension, the movable gear having a hinge for allowing pivoting of one end due to reciprocation of the lock slider; and a fixed gear provided in an underside of a lower bracket for being engaged with the movable gear.

Preferably, a circular portion of the tilt lever is inserted into a substantially circular coupling groove within the lock slider to define a superposed portion between the tilt lever and the lock slider.

In another aspect of the present invention, a tilt device for adjusting the angle of a steering column is provided, which includes a fixed gear mountable to one of a fixed portion of the steering column and a movable portion of the steering column, a movable gear mountable to the other of the fixed portion of the steering column and the movable portion of the steering column, and a lock slider engageable with the movable gear, and slidable relative thereto, to cause the movable gear to selectively lockingly engage with the fixed gear. A tilt lever is engageable with the lock slider to cause the movable gear to reciprocate between a position of engagement with the fixed gear and a position of disengagement from the fixed gear.

In other aspects of the present invention, the movable gear may be pivotally mounted to the other of the fixed portion of the steering column and the movable portion of the steering column, and the movable gear includes a recessed portion that is engageable by the slide block and is pivotally movable in a first direction due to reciprocation of the lock slider. The movable gear may further include a downwardly extending projection that is engageable by the slide block and is pivotally movable in a second direction due to reciprocation of the lock slider. Also, the lock slider may include an opening, and the tilt lever may be pivotally mounted and extends through the opening and is engageable with the lock slider at a position spaced from the pivotal mounting of the tilt lever. Moreover, the tilt lever may include a generally circular portion configured to be engaged with a generally circular coupling groove provided within the lock slider to define a movable connection between the tilt lever and the lock slider.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present a tilt device for a vehicular steering column according to one embodiment of the present invention in reference to the accompanying drawings.

Figure 1:
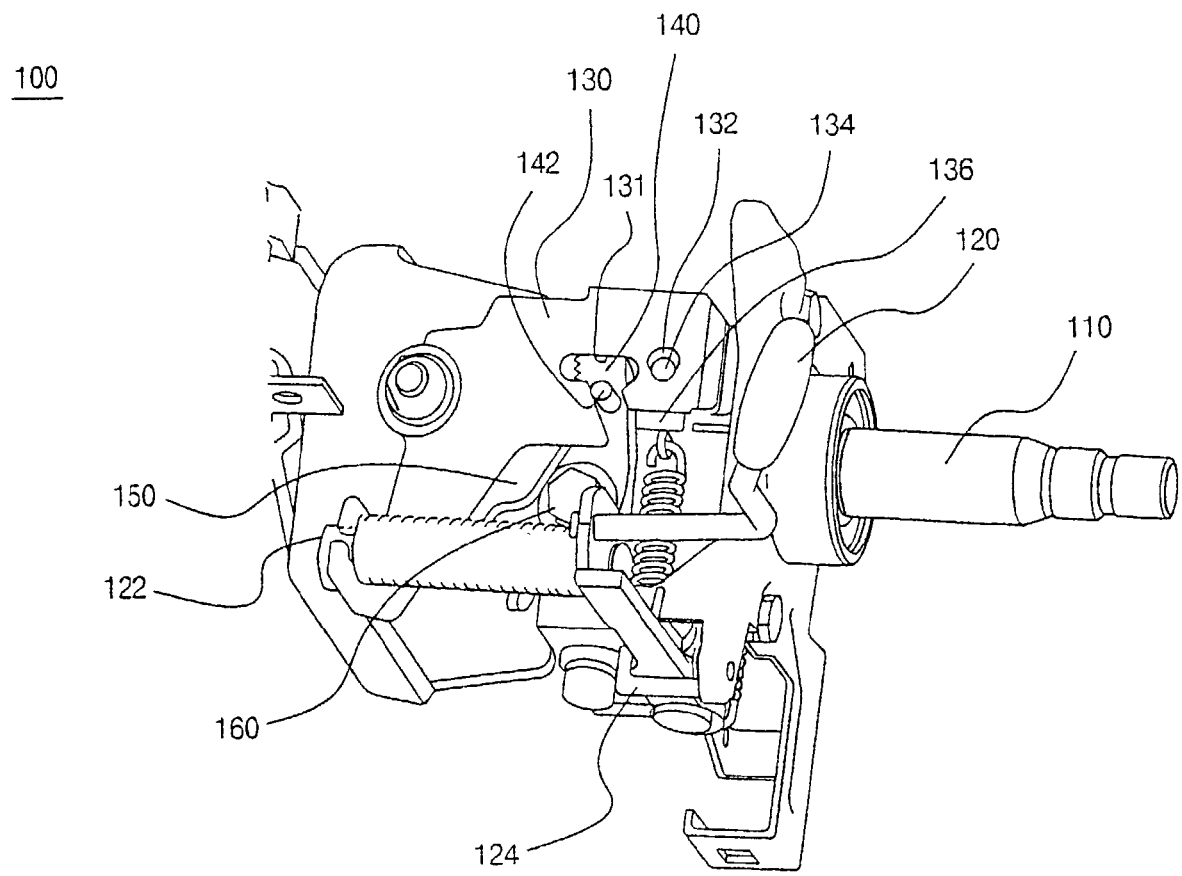
FIG. 1 is a perspective view schematically illustrating a conventional tilt device for a steering column.
Figure 2:
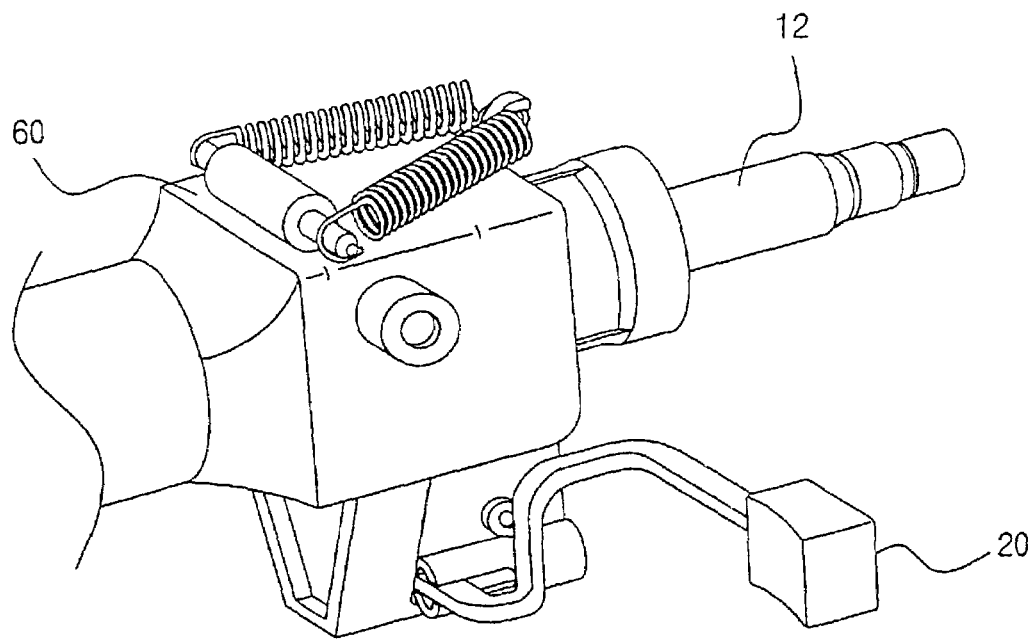
FIG. 2 is a perspective view schematically illustrating a tilt device according to an embodiment of the present invention.
Figure 3:
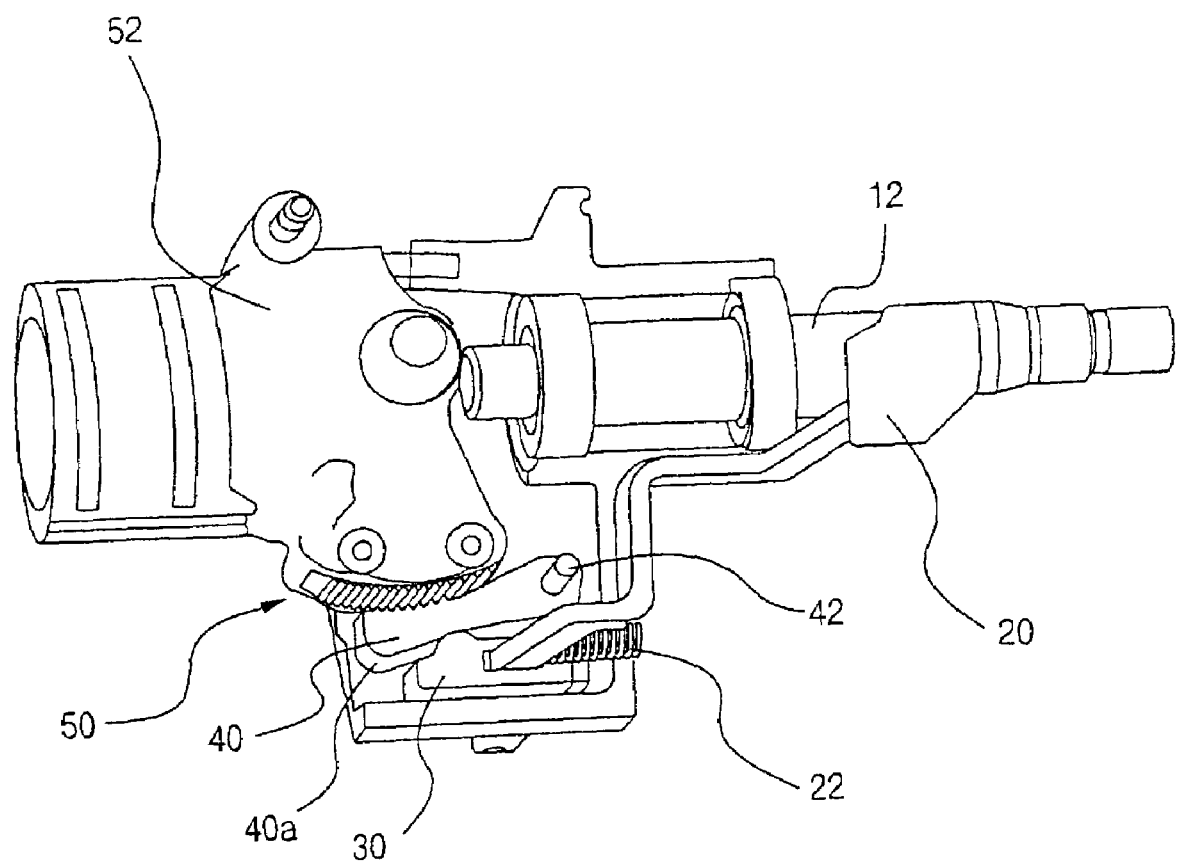
FIG. 3 is a partial sectional perspective view schematically illustrating major parts of the tilt device in FIG. 2.
Figure 4:
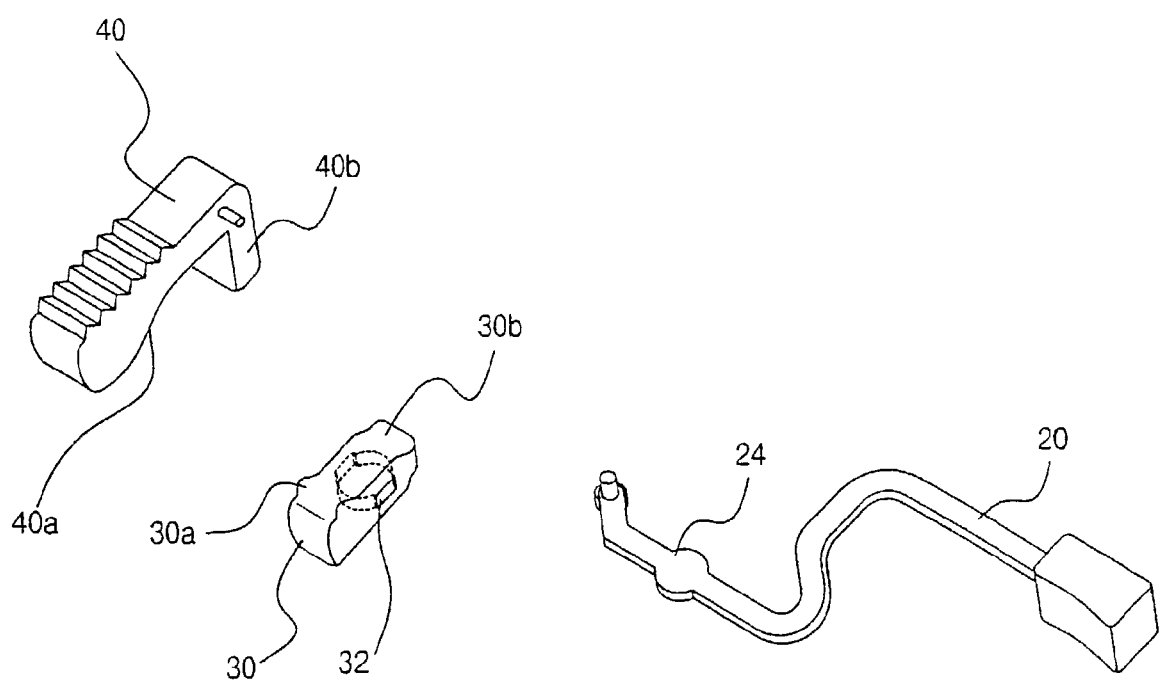
FIG. 4 is an exploded perspective view illustrating some parts of the tilt device in FIG. 2.

FIG. 2 is a perspective view schematically illustrating a tilt device according to an embodiment of the invention, FIG. 3 is a partial sectional perspective view schematically illustrating major parts of the tilt device in FIG. 2, and FIG. 4 is an exploded perspective view illustrating some parts of the tilt device in FIG. 2.

As shown in FIGS. 2 and 3, the tilt device 10 of the present invention includes an operating lever 20 mounted with a restoring spring 22 having one hinged end for imparting restoring force, a movable gear 40 positioned over a lock slider 30 penetrated by the operating lever 20 and a fixed gear 50 formed in the underside of a lower bracket 52 and configured for engagement/disengagement into/from the movable gear 40 due to pivoting thereof.

The lock slider 30 penetratingly coupled by the operating lever 20 regulates pivoting of the movable gear 40 having a movable gear hinge 42 at one side while horizontally moving in the moving direction of the operating lever 20. The regulation of pivoting is made by cooperatingly mounting a recessed backside 40a provided in the movable gear 40, an upward projection 30a of the lock slider 30, a downward inflection 40b of the movable gear 40 and an extension 30b of the lock slider 30.

Engagement/disengagement between the movable gear 40 and the fixed gear 50 due to pivoting allows angular adjustment or fixing of the steering column 12.

Further, FIG. 4 schematically shows the coupling structure of the operating lever 20 and the lock slider 30, in which a circular portion 24 of the operating lever 20 is inserted into and coupled with a substantially circular coupling groove 32 of the lock slider 30.

In the meantime, a housing 60 is so installed to internally mount the lock slider 30, the movable gear 40 and the fixed gear 50 while surrounding a joining portion of the steering column 12.

Hereinafter the operating sequence of the tilt device configured as above will be briefly described.

First, when the operating lever 20 is moved to release tilting, the extension 30b in the lock slider 30 pushes the downward inflection 40b of the movable gear 40 and simultaneously the upward projection 30a of the lock slider 30 slides into a recess in the recessed backside 40a of the movable gear 40 so that the movable gear 40 pivots about the movable gear hinge 42.

Disengagement of the movable gear 40 from the fixed gear 50 due to pivoting permits adjustment of the angle of the steering column 12. With the angle of the steering column 12 having been adjusted, the external force applied to the operating lever 20 is removed restoring the same into the original position due to the restoring spring 22. As the operating lever 20 is restored into its original position, the lock slider 30 is moved so that the movable gear 40 is pivoted and engaged into the fixed gear 50 thereby completing tilt adjustment of the steering column 12.

The above configured invention has the following effects.

The tilt device has a simple structure to improve assembling ability which results in saving manufacturing cost. The precision and fastening force of engagement are enhanced between the fixed gear and the movable gear due to pivoting of the operating lever. As the operating lever and the lock slider are stably coupled, the operating force of the operating lever is minimized and friction induced noise is lowered as well as the burden of after service is relieved.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present application claims priority under 35 U.S.C. §119 of Korean (Republic of Korea) Application No. KR 2002-519, filed on Jan. 4, 2002, the disclosure of which is expressly incorporated herein by its entirety.

What is claimed is:

1. A tilt device for adjusting the angle of a steering column through selective engagement and disengagement between a fixed gear and a movable gear, said tilt device comprising:
    a tilt lever;
        a lock slider configured to reciprocate in opposite directions and having an upward projection and an extension at one side, said lock slider being penetrated by said tilt lever and movable with respect thereto to reciprocate due to pivoting of said tilt lever;
    said movable gear having a recessed underside and a downward inflection at one side, each contacting a respective one of said projection and said extension, said movable gear having a hinge allowing pivoting of one end due to reciprocation of said lock slider;
    said fixed gear provided in an underside of a lower bracket and engageable with said movable gear.

2. The tilt device according to claim 1, wherein a circular portion of said tilt lever is positioned within a substantially circular coupling groove within said lock slider to define a superposed portion between the tilt lever and the lock slider.

3. A tilt device for adjusting the angle of a steering column, said tilt device comprising:
    a fixed gear mountable to one of a fixed portion of the steering column and a movable portion of the steering column;
    a movable gear mountable to the other of the fixed portion of the steering column and the movable portion of the steering column, the movable gear comprising a recessed underside and a downward inflection;
    a lock slider engageable with said movable gear, and configured to slidably reciprocate in the opposite directions relative thereto, to cause said movable gear to selectively lockingly engage with said fixed gear, the lock slider comprising an upward projection and an extension; and
    a tilt lever directly engageable with said lock slider to cause said movable gear to pivot between a position of engagement with said fixed gear and a position of disengagement from said fixed gear, wherein said tilt lever is movable relative to said lock slider; and wherein each of the recessed underside and the downward inflection contacts a respective one of the projection and the extension, and one end of the movable gear is pivotally mounted.

4. The tilt device according to claim 3, wherein said movable gear is pivotally mounted to the other of the fixed portion of the steering column and the movable portion of the steering column, and said movable gear includes a recessed portion, as the recessed underside, that is engageable by said lock slider and is pivotally movable in a first direction due to reciprocation of said lock slider.

5. The tilt device according to claim 4, wherein said movable gear further includes a downwardly extending projection, as the downward inflection, that is engageable by said lock slider and is pivotally movable in a second direction due to reciprocation of said lock slider.

6. The tilt device according to claim 3, wherein said lock slider includes an opening, and said tilt lever is pivotally mounted and extends through said opening and is engageable with said lock slider at a position spaced from the pivotal mounting of said tilt lever.

7. The tilt device according to claim 6, wherein said tilt lever includes a generally circular portion configured to be engaged with a generally circular coupling groove provided within said lock slider to define a movable connection between said tilt lever and said lock slider.

* * * * *